(12) United States Patent
Singh et al.

(10) Patent No.: US 10,949,880 B2
(45) Date of Patent: Mar. 16, 2021

(54) METHOD FOR OPTIMIZING MEDIA AND MARKETING CONTENT USING CROSS-PLATFORM VIDEO INTELLIGENCE

(71) Applicant: ICX Media, Inc., Washington, DC (US)

(72) Inventors: Jyotika Singh, Winnetka, CA (US); Rebecca Bilbro, Washington, DC (US); Michael Avon, McLean, VA (US); Scott Bowen, Falls Church, VA (US); Dan Jolicoeur, Annapolis, MD (US); Serge Matta, Vienna, VA (US)

(73) Assignee: ICX Media, Inc., Washington, DC (US)

( * ) Notice: Subject to any disclaimer, the term of this patent is extended or adjusted under 35 U.S.C. 154(b) by 0 days.

(21) Appl. No.: 16/838,234

(22) Filed: Apr. 2, 2020

(65) Prior Publication Data
US 2020/0320571 A1    Oct. 8, 2020

Related U.S. Application Data

(60) Provisional application No. 62/828,814, filed on Apr. 3, 2019.

(51) Int. Cl.
| | | |
|---|---|---|
| *G06Q 30/02* | (2012.01) | |
| *G06N 20/00* | (2019.01) | |
| *H04N 21/442* | (2011.01) | |
| *G06Q 50/00* | (2012.01) | |

(52) U.S. Cl.
CPC ......... *G06Q 30/0255* (2013.01); *G06N 20/00* (2019.01); *H04N 21/44213* (2013.01); *G06Q 30/0244* (2013.01); *G06Q 50/01* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 2002/0123928 A1* | 9/2002 | Eldering | G06Q 30/0255 705/14.52 |
| 2004/0122654 A1* | 6/2004 | Moore | G06F 40/56 704/4 |
| 2007/0008956 A1* | 1/2007 | Moran | H04L 43/00 370/352 |
| 2009/0037967 A1* | 2/2009 | Barkan | H04N 21/6582 725/105 |
| 2009/0247282 A1* | 10/2009 | Cheng | G07F 17/3255 463/25 |

(Continued)

OTHER PUBLICATIONS

Lee Young, Notification of Transmittal of the International Search Report and the Written Opinion of the International Searching Authority, or the Declaration, dated Jun. 29, 2020, Commissioner for Patents, Alexandria, Virginia.

*Primary Examiner* — Vincent M Cao
(74) *Attorney, Agent, or Firm* — Woods Rogers PLC; Nathan A. Evans

(57) ABSTRACT

The invention is directed to a computer-implemented method of analyzing video interactions on internet-supported computer platforms, such as online social media platforms, to extract video intelligence, i.e. unique insights and recommendations for audience engagement optimization, network growth, advertising, and marketing purposes.

25 Claims, 12 Drawing Sheets

(56) References Cited

U.S. PATENT DOCUMENTS

| | | | |
|---|---|---|---|
| 2010/0008255 A1* | 1/2010 | Khosravy | G01C 21/3664 |
| | | | 370/254 |
| 2010/0125502 A1* | 5/2010 | Solomon | G06Q 30/0254 |
| | | | 705/14.52 |
| 2012/0226602 A1* | 9/2012 | Narcisse | H04W 4/185 |
| | | | 705/39 |
| 2012/0281969 A1* | 11/2012 | Jiang | G11B 27/034 |
| | | | 386/278 |
| 2013/0041653 A1* | 2/2013 | Tseng | G06F 16/90324 |
| | | | 704/9 |
| 2013/0232263 A1* | 9/2013 | Kelly | G06F 16/285 |
| | | | 709/224 |
| 2013/0254035 A1 | 9/2013 | Ramer et al. | |
| 2015/0081604 A1 | 3/2015 | Duque et al. | |
| 2015/0186939 A1* | 7/2015 | Li | G06F 16/9535 |
| | | | 705/14.54 |
| 2015/0365725 A1* | 12/2015 | Belyaev | H04N 21/8133 |
| | | | 725/46 |
| 2016/0328384 A1 | 11/2016 | Divakaran et al. | |
| 2017/0134806 A1 | 5/2017 | Scavo et al. | |
| 2018/0114238 A1* | 4/2018 | Treiser | G06Q 50/01 |

* cited by examiner

METHOD FOR OPTIMIZING MEDIA AND MARKETING CONTENT USING CROSS-PLATFORM VIDEO INTELLIGENCE

CROSS-REFERENCE TO RELATED APPLICATIONS

The present application relies on the disclosures of and claims priority to and the benefit of the filing date of U.S. Provisional Application No. 62/828,814, filed Apr. 3, 2019. The disclosures of that application are hereby incorporated by reference herein in their entireties.

BACKGROUND OF THE INVENTION

Field of the Invention

Embodiments of the present invention are directed to a computer-implemented method of analyzing video interactions on internet-supported computer platforms, such as online social media platforms, to extract video intelligence, i.e. unique insights and recommendations for audience engagement optimization, network growth, advertising, and marketing purposes. In aspects, the more general field of invention is commonly referred to by people of ordinary skill in the art as "big data."

Embodiments include a software implementation that enables the study of audience behavior from their interactions on social media platforms, which yields insights for video content creators on content and messaging that will be more or less successful with their target audiences.

One focus area is on the language used by consumers of video content, and the design and implementation of language-based classifiers that can be used to understand the characteristics of audiences of specific videos, of individual creators, or groups of related creators.

Another focus area is on automated video content analysis, where audio-visual components are extracted from raw video content and used as features to construct models to predict the interest and engagement of different audience demographics.

Embodiments also include an unsupervised machine learning model that analyzes both language and video patterns to identify peer sets of creators, which enables cross-creator analytics and comparison across different social media platforms.

Description of Related Art

The process of designing, sourcing, producing, publishing, marketing, and optimizing video content on social media platforms has historically relied upon trial-and-error. Video content creators create content they believe may resonate with audiences, and select a social media platform or platforms on which to publish the new content. Next, they use a combination of free-text and platform-specific drop-down fields to add descriptive titles, narratives, tags, and other metadata to the content, which will be used by the social media platforms to make the content discoverable and appealing to the video consumers searching through content. Unfortunately, such ad hoc processes often result in many wasted hours of creator time, failures to successfully market content to target audiences, missed opportunities to unpack and explore contingencies within a creator's viewership, and poor search engine optimization for effective audience capture. As such, computer-implemented and automated processes for capturing potential audiences of social media video content and increasing their engagement are needed.

SUMMARY OF THE INVENTION

Embodiments of the present invention infer audience attributes using computer-implemented natural language processing and supervised machine learning on the textual artifacts of their interactions with video content.

For example, in one embodiment, a computer-implemented method is provided that allows for reviewing and analyzing viewing and engagement habits of video consumers to algorithmically determine their gender, age, location, ethnicity, education, income, topical interests, personality type, political stance, sentiment (positive, negative and neutral) and emotion categories (e.g., anger, joy, humor, sadness) and sentiment themes, based on consumer video interactions across online social media platforms such as YouTube, Facebook, Instagram, Twitter, Vimeo and Twitch, by way of example.

In another embodiment, a computer-implemented method is provided that allows for reviewing and analyzing video viewing and engagement habits of consumers and determining topical interest areas of social video consumers based on the video content they watch. These topical interests can be used to find similarities and differences between two or more target audiences, such as the affinity between the audience of an independent video creator and that of a large consumer brand, or the differences between the audience of a large consumer brand and that of their competitors.

Embodiments also analyze the audio-visual components (objects, people, ambient noise, music, etc.) of videos with respect to their audience engagement patterns including views, likes, dislikes, upvotes, downvotes, shares, links, quotes, and comments.

For instance, in another embodiment, a computer-implemented method is provided that allows for recognizing audio components of videos and modeling the relationships between those audio components and the engagement metrics for video audiences across online social media platforms such as YouTube, Facebook, Instagram, Twitter, Vimeo and Twitch with respect to their demographics, interests, sentiments, and emotions.

In another embodiment, a computer-implemented method is provided that allows for recognizing visual components of videos (by analyzing video frames and identifying elements of videos, including the setting, number and ethnicity of cast, objects in the video, and music) and modeling the relationships between those components (objects, background, color, shapes, human faces and figures) and engagement metrics for video audiences across online social media platforms such as YouTube, Facebook, Instagram, Twitter, Vimeo and Twitch with respect to their demographics, interests, sentiments, and emotions.

Embodiments also evaluate performance and practices of a content creator with respect to their extracted peer set. In another embodiment, a computer-implemented method is provided that allows for extrapolating peer sets of content creators based on video content similarity, content statistics, audience demographics and audience engagement metrics across online social media platforms such as YouTube, Facebook, Instagram, Twitter, Vimeo and Twitch.

In another embodiment, a computer-implemented method is provided that extrapolates trends in high-engagement video topics, themes, and elements from peer set video content, thereby rendering automated recommendations for video creators for in-demand content.

In another embodiment, a computer-implemented method is provided that identifies real-time or near real-time trends from video topics, themes, and elements from peer set video content, thereby rendering recommendations for video creators on optimal post time, frequency, platform, length, messaging and marketing (title, description, keywords, hashtags).

In another embodiment, a computer-implemented method is provided that renders automated recommendations for optimized video messaging and marketing (title, description, keywords, hashtags) to content creators that can be accepted and automatically applied.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 7 further illustrates how the resultant models are stored and reconstituted on demand in deployment to map new creators to existing peer sets according to an embodiment.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Embodiments of the present invention provide a computer-implemented mechanism for automatically extracting video intelligence from existing video data to provide tailored insights for video content creators to empower informed, tactical and strategic decision-making around both the creative process and the ensuing publishing and marketing processes.

In one embodiment, a computer processing device(s) analyzes existing video data in an asynchronous or synchronous manner to produce automated recommendations for how a video content creator can grow their network of viewers (i.e. get more people to watch their videos), optimize their audience engagement (i.e. get more people to provide feedback on their videos such as commenting, liking, upvoting, linking to, or sharing the video content), and more effectively market their content to specific demographic and interest groups (e.g. improve discoverability with Millennial Asian women, or with electronics enthusiasts from Atlanta, Ga.).

Figure 1:
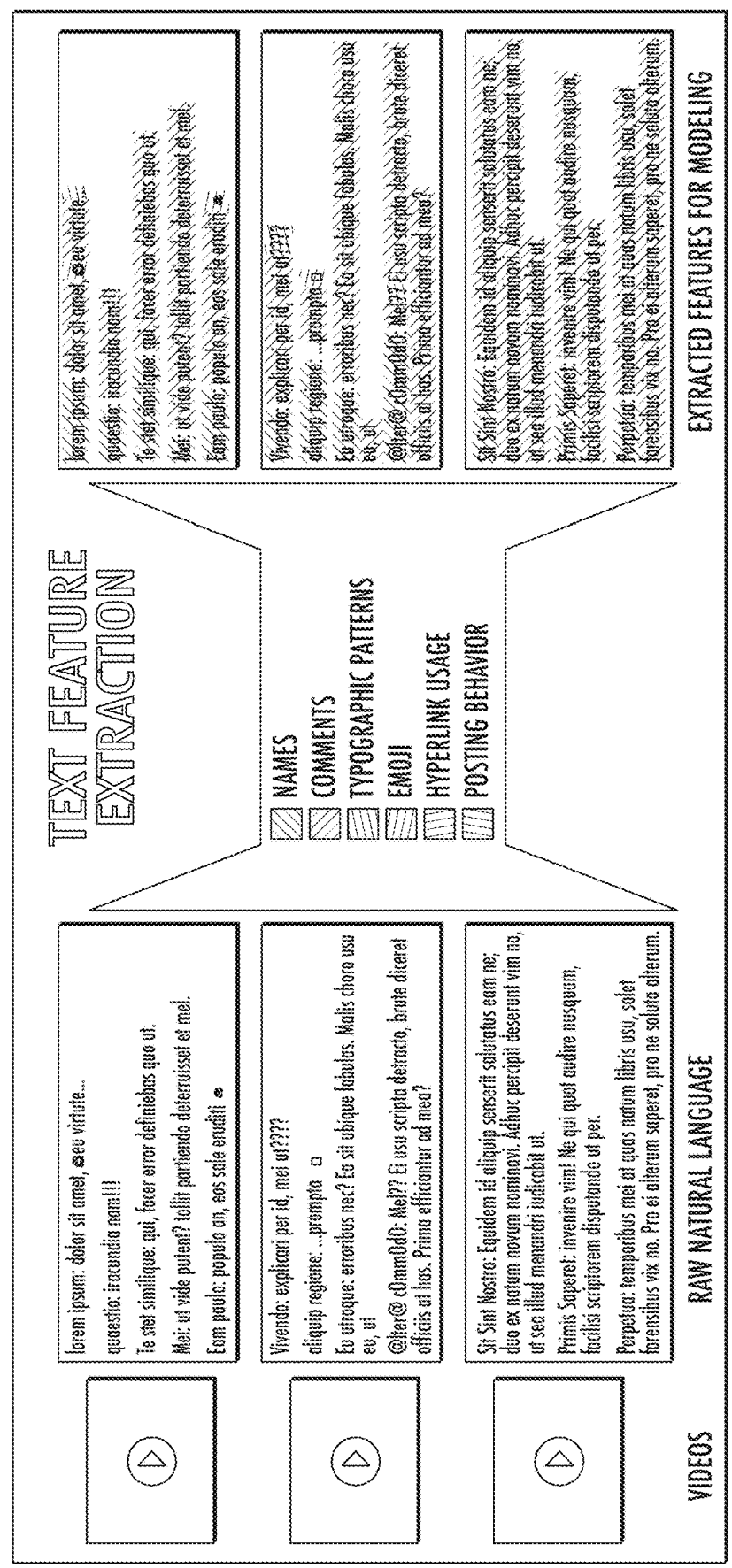
FIG. 1 is a schematic diagram illustrating the extraction of features (names, comments, typographic patterns, emoji, hyperlink usage, posting behavior) from raw text using Natural Language Processing for use in supervised machine learning model training according to an embodiment.

Demographic and topical recommendations are generated in part using an ensemble of computer-applied language-based classifiers to understand, and then predict, audience characteristics. This process includes extracting data (as shown in FIG. 1) from the text of comments and interactions to videos, including commenters' proper names, emojis, urls, keywords and keyphrases, grammatical patterns, and posting behaviors such as times and frequencies. FIG. 1 illustrates the extraction of features (names, comments, typographic patterns, emoji, hyperlink usage, posting behavior) from raw text using Natural Language Processing for use in supervised machine learning model training. From such extracted features, features can be engineered to capture how the audience perceives the content, such as video sentiment and emotions (i.e., how a viewer or set of viewers feel(s) about the video).

Figure 2:
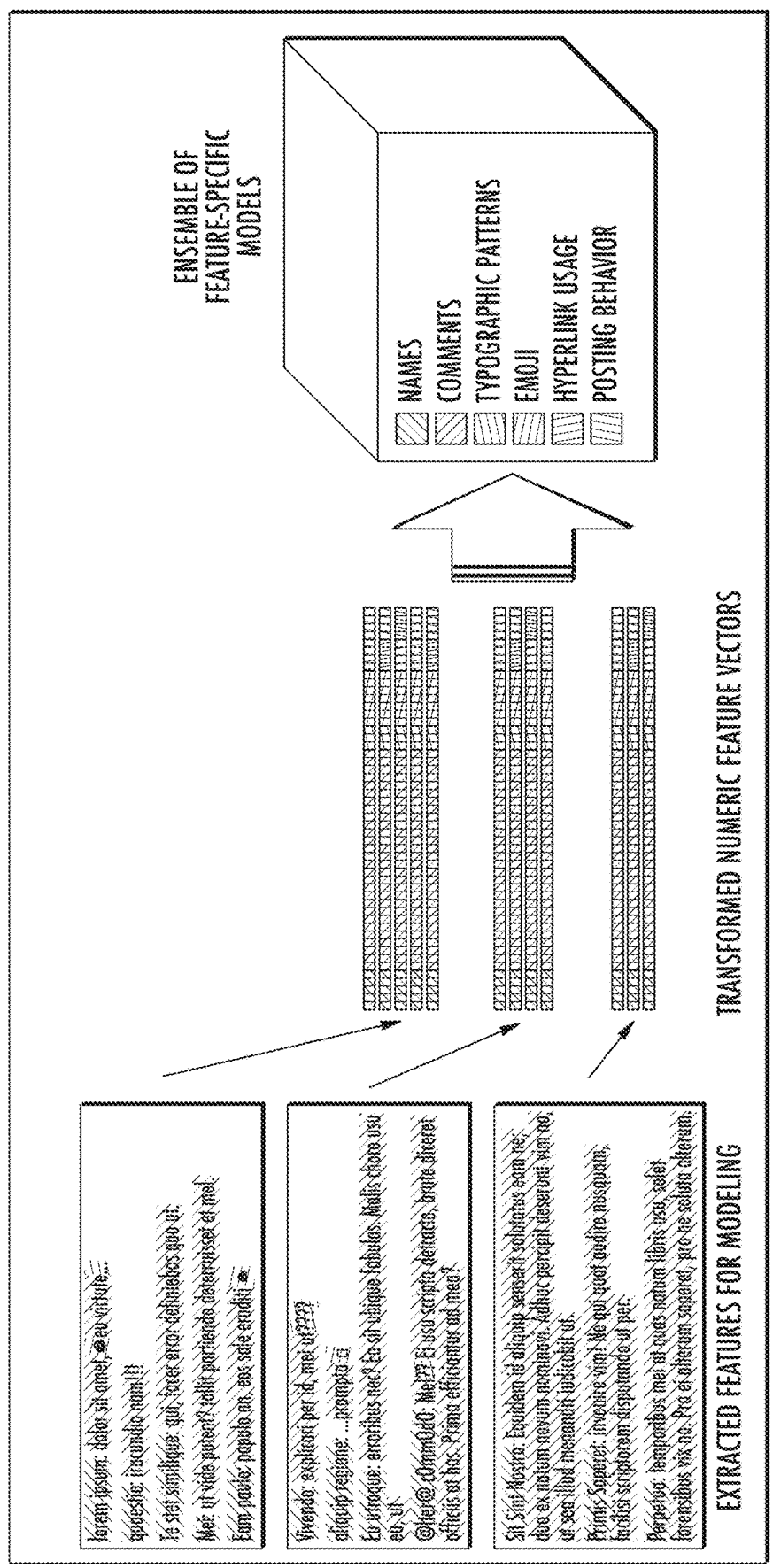
FIG. 2 is a schematic diagram demonstrating the transformation of extracted text features into composite numeric feature vectors and training of an ensemble of proprietary feature-specific models according to an embodiment.

Embodiments then determine features out of this data that capture interactions and consumer details. FIG. 2 demonstrates the transformation of extracted text features into composite numeric feature vectors which can be projected into a multidimensional space and used in the training of an ensemble of feature-based text classification models. These feature-based models include models that, for example, convert a username into an age or gender probability distribution, that transform the text of comments into frequency distributions of keywords, and that extract a time series from users' posted comments. As an ensemble, these gender probability distributions, keyword frequency distributions, and time series analyses can be used together to make predictions about changes in a certain demographic group's beliefs and feelings about popular issues over time. The text classifiers are built (trained) using a variety of datasets, some publicly available and some that have been gathered, and using a combination of manual and algorithmic curation. This algorithmic curation includes a process through which similar data samples can be identified using feature similarity, for example, finding similar comments using similarity in context and writing style. A classification pipeline is constructed using a combination of these datasets and natural language processing-based feature extraction, feature engineering, and feature vectorization methods. This classification pipeline is built to incorporate the full series of model training steps; including data cleaning, streaming, filtering, feature extraction, vectorization, normalization, and dimensionality reduction, followed by supervised learning, evaluation, comparison and testing processes. This pipeline is stored in addition to the serialized versions of each of the classifiers, such that the classifiers can be deployed to serve predictions on demand, and such that the pipeline can be continually retrained and improved as new data become available.

In aspects and as used herein generally, vectorization may mean but is not limited to vectorizing comments or profile descriptions from social media. In general vectorization may refer to creating a set of words and textual features (e.g., emoji, keyphrases, or timestamps) that appear either in those comments and descriptions or in their metadata; creating a fixed-length array of numbers (like a cipher) that is the same length as the total count of words and textual features across all of the comments and descriptions; and creating a representation of every comment or some comments and descriptions with respect to the array. In some cases as used herein, the terms "multidimensional" and/or "high dimensional" would be understood by one of ordinary skill in the art, and the terms refer to machine learning as using "multidimensional" and/or "high dimensional" vectors, and in cases the terms are used interchangeably.

Figure 3:
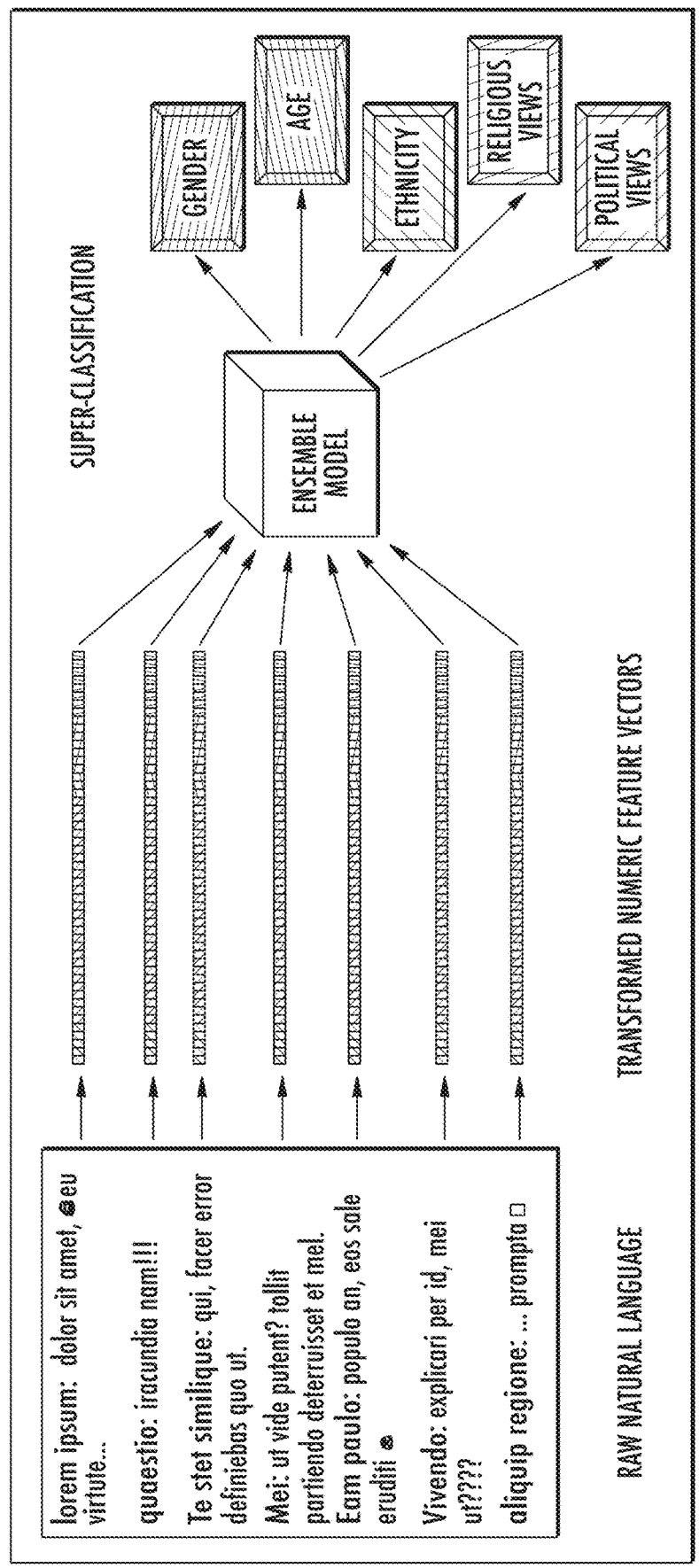
FIG. 3 is a schematic diagram showing how a pre-trained ensemble model is used to classify new, unseen data using stored model artifacts that include pipelines for feature extraction, vectorization, and classification according to an embodiment.

Once trained, the classifiers, using computing processing, classify new incoming data into meaningful categories. For example, after a new video is published, comments posted in response to the new video can be aggregated, and predictions can be made about the gender, age, location, ethnicity/race, religious views, political stance, education, income, personality type, and language of the commenters. FIG. 3 shows how a pre-trained ensemble model is used to classify new, unseen data using stored model artifacts that include pipelines for feature extraction, vectorization, and classification. In one embodiment, the results of the classification are used in better informing content creators about their audience, and to automate and supply potential recommendations that can help a content creator or advertiser grow the audience, their reach, and their influence. For example, the classifiers can be used to provide a given Creator X with an algorithmically filtered list of creators who are successfully making similar content, to automatically evaluate Creator X's content relative to the competition, and to automatically adjust the tunable parameters of Creator X's content on the social platform (e.g. hashtags, titles, descriptions) in order to optimize for more views, more positive comments, more shares, etc. The classifiers can also be used to propose new topics and content recommendations to Creator X for content likely to perform well with his or her audience.

Figure 4:
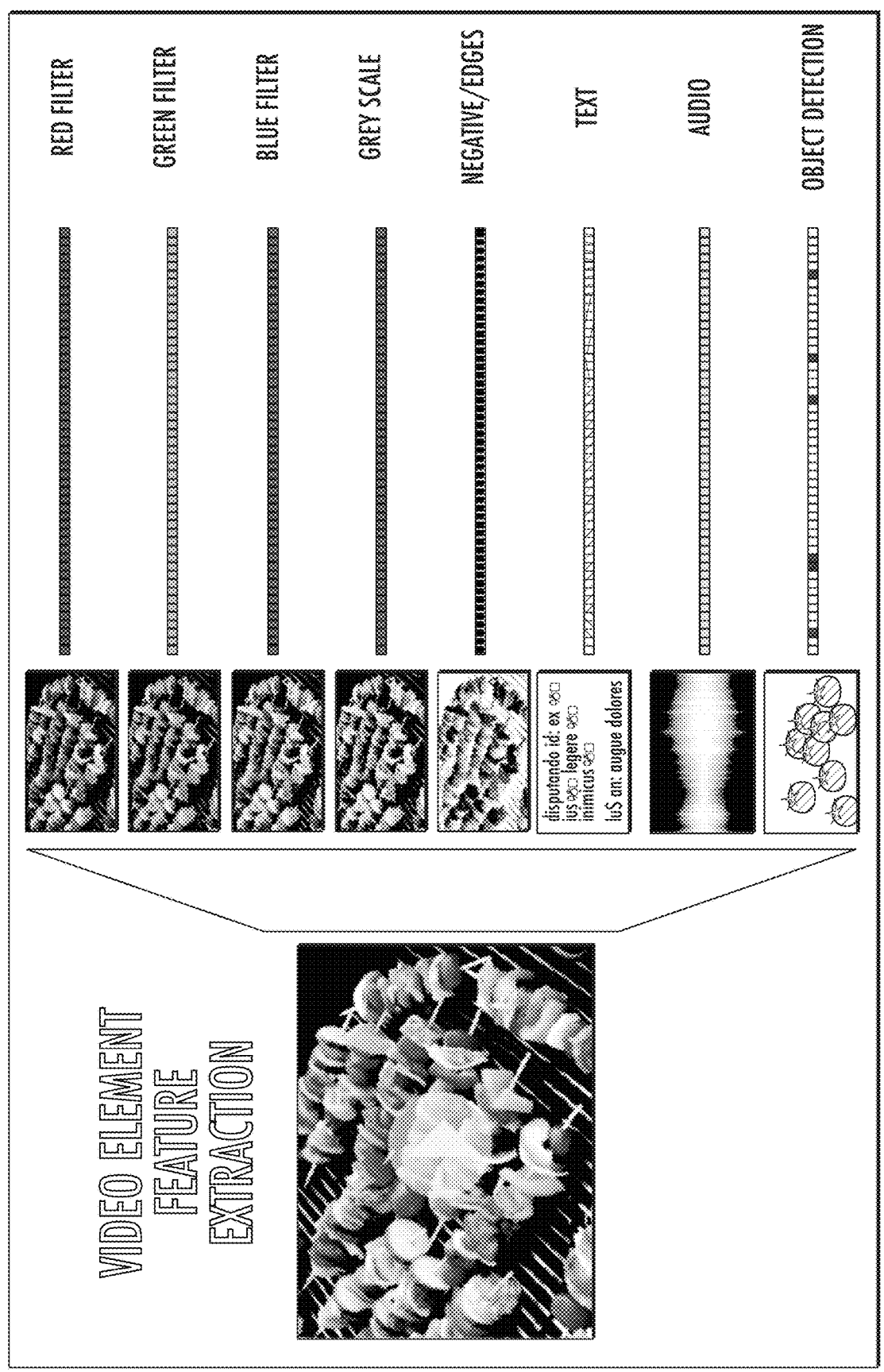
FIG. 4 is a schematic diagram illustrating the extraction of audiovisual content elements from raw video and their transformation into numeric feature vectors for downstream modeling according to an embodiment.
Figure 11:
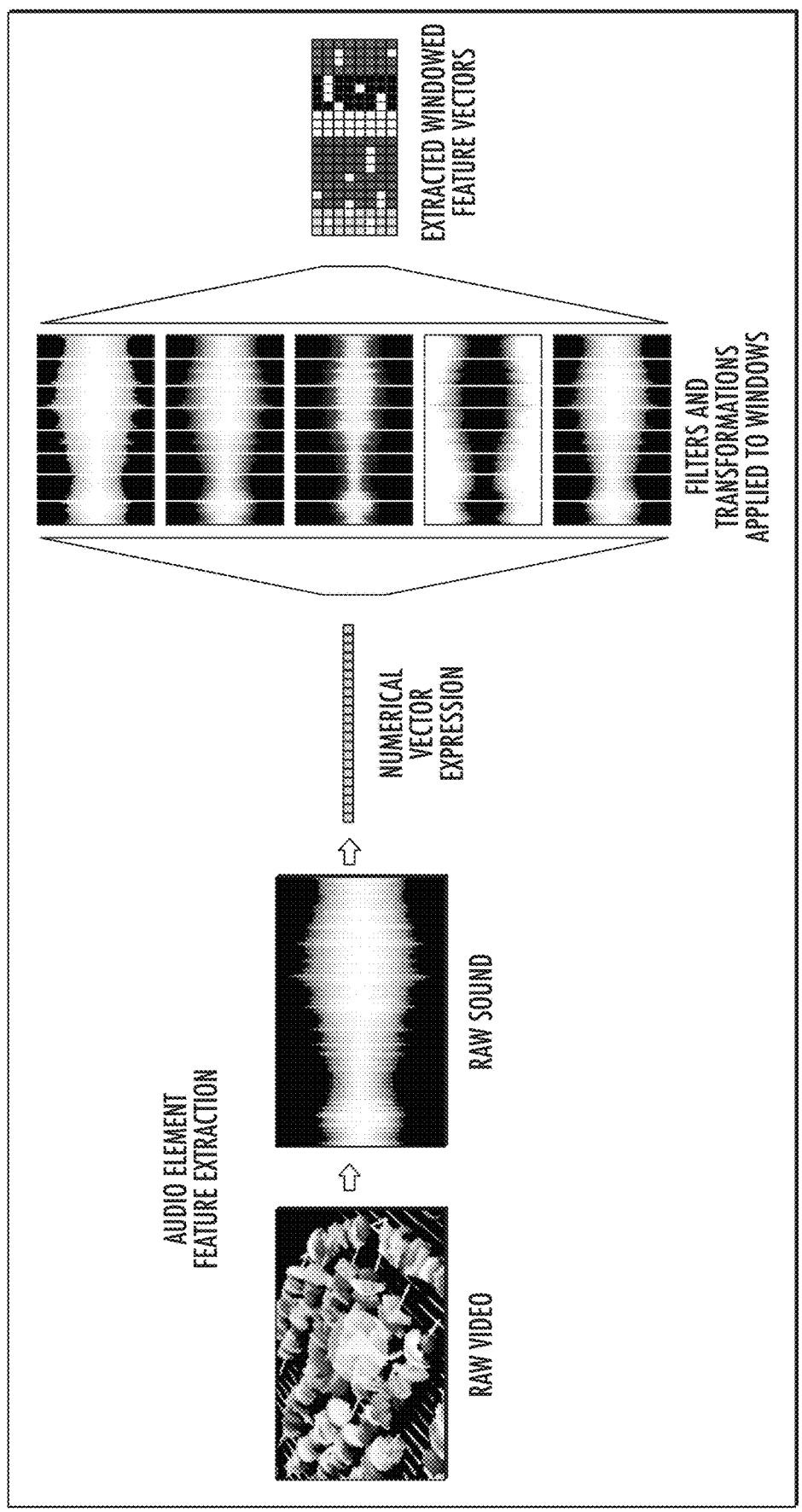
FIG. 11 is a schematic diagram showing extraction of audio features from a video according to an embodiment.
Figure 12:
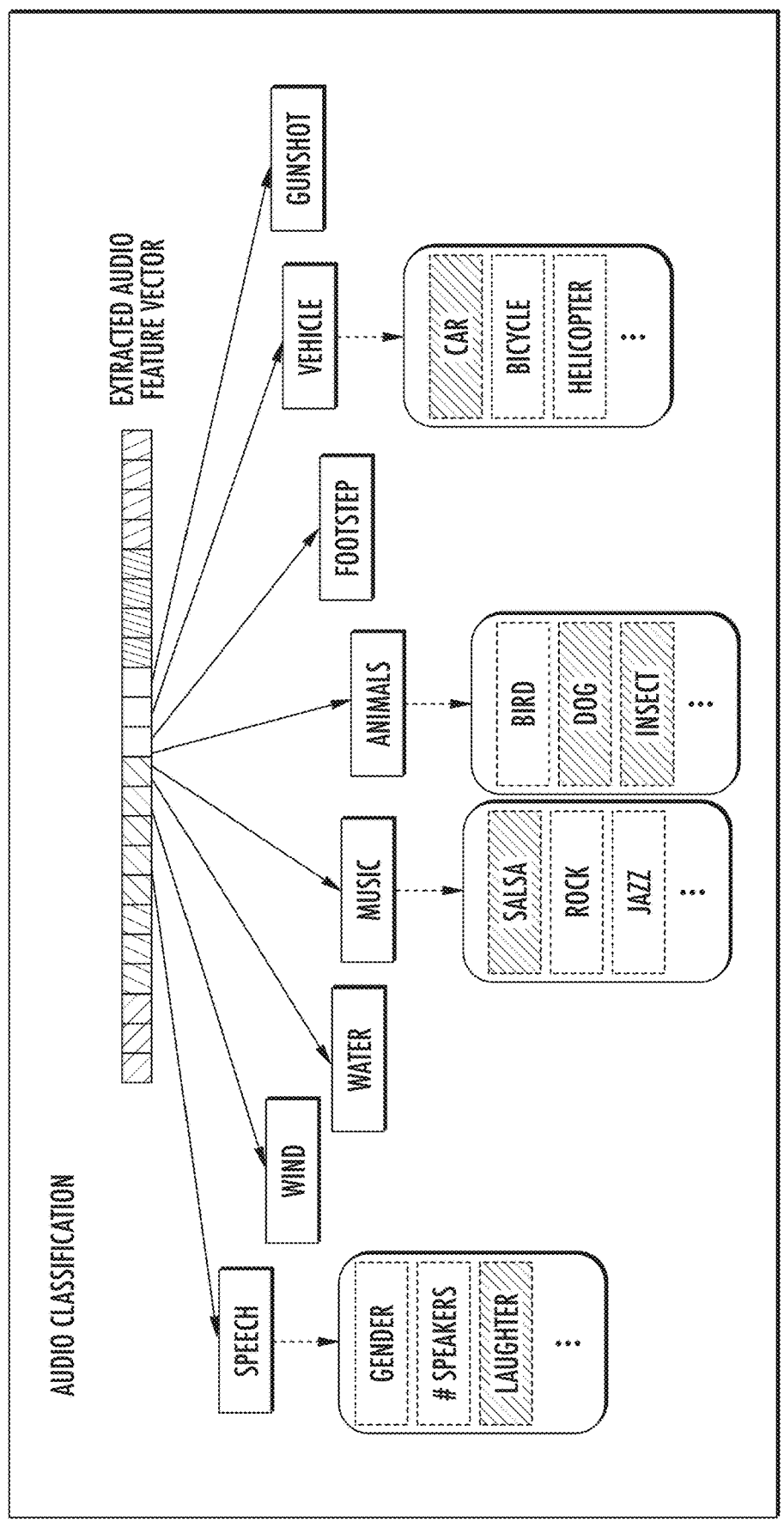
FIG. 12 is a schematic diagram showing some of the categories and subcategories that an audio signal can be classified into according to an embodiment.

However, embodiments of the present invention go beyond just the textual contexts of videos (e.g. video titles, comments, tags, etc.) in order to derive video intelligence analytics and recommendations, such as combining textual context with audio-visual content (objects, people, ambient noise, music, etc.) to generate unique predictions about audience affinity and topical relevance. To achieve this, computer-implemented extraction of audiovisual content elements from raw video is performed, as illustrated in FIG. 4. Extracting audio-visual features from raw video content requires using computer processing mechanisms to extract both audio components and visual components from such content. The audio component of this operates by first extracting the audio components from the video components and breaking down the extracted audio into multiple audio features and computer files, as illustrated in FIG. 11. First, the audio signal is converted to a numerical representation which is based on the length of the signal and sampling frequency. The numerical audio signal is then passed through computerized filters and transformations to represent mathematically meaningful elements of the audio signal. This begins by reading the audio file and converting stereo signal to mono signal. The signal is then further broken down using computerized sampling frequency, mid-term signal attributes, and shortterm signal attributes. Window ratio and step ratio are then extracted from the frequency and signal attributes, and signal normalization is performed. Other information associated with metadata attached to the video and other derived components also play into this classification process. Some of the features used in the classification process include explorations with Gammatone Frequency Cepstral Coefficients, which have been previously found to be useful for the speech category of audio and now a version of which is applied by the present invention to other novel categories as well, Mel Frequency Cepstral Coefficients, centroid and spread, spectral entropy, spectral flux, short-term energy and entropy of energy, zero crossing rate and more. The Gammatone Frequency Cepstral Coefficients feature is constructed by processing the signal with a gammatone filter bank. The resultant signal is passed through a matrix multiplication with DCT-II matrix of the order of the signal array. These feature extractions are performed for short term windows in the entire signal. For every window, normalized Fast Fourier Transformations (FFTs) are computed, and combined with the other features to produce a single vector for each audio instance. The feature vector then goes through additional mathematical manipulations such as feature normalization. The resultant feature is passed through digitally pre-built classifiers with the generated proprietary input features as described from audio files and carefully selected hyperparameters which results in the piece of audio getting classified into categories including, for example, music, speech, birds, pets, animals, crowd, beach, water, weather, rain, vehicles, wind, footsteps, gunshots, silence, running, motor, other noise and more, as illustrated in FIG. 12. This audio will then be further classified into more detailed categories from those listed above, such as music genre, type of musical instrument, gender of speech, speaker identification, speech style, speech transcription, type of vehicle, animal species, and so on. The data used to train the classifier is manually, digitally, automatically, and/or algorithmically cleaned and enhanced to result in a training set that represents each category. The algorithmic cleaning and enhancing includes removing silent and unwanted portions of an audio instance, using any hand labeled samples to find audio instances that share similar attributes, and using the classifier previously trained on the known audio to classify unseen instances into classes, which aids further segregation of the samples and helps add to the training data set.

The visual component operates using a computer processing mechanism to analyze each frame image of the video. These image frames are represented in pixel values and ultimately processed into numeric-based features after being passed through a series of processing and filtering steps. For example, images are passed through the process of detecting blank sections and cropping to exclude blank borders and divide the image into regions. Parts of an image can then be used to perform face detection, where min, max, mean and median color calculations are used to narrow down to specific portions of human faces (eyebrows, nostrils, lips, etc.). The processing steps return features that mathematically represent the useful image details. These features are then passed through pre-built neural network classifiers to recognize the objects observed in the images, such as a chair, a table, a beach, a human, or a cheetah. The visual component also undergoes more processing to detect humans in the images and analyze their faces. This additional processing helps in analyzing such features as the number of humans, genders, diversity, emotion, expression and more. In addition, more processing takes place leading to an image background analysis that differentiates between indoor versus outdoor settings and performs further classification of the background scene—such as home, theatre, forest and so on. Other image analysis of pixels, shapes and colors also plays into analysis at the video frame level. These per image frame elements are then combined per video to provide an aggregate video-based analysis. The audio-visual analysis components are also combined with other statistical, demographic, sentiment, emotion, and audience interest data, resulting in a more powerful analysis on consumer watching habits.

Figure 5:
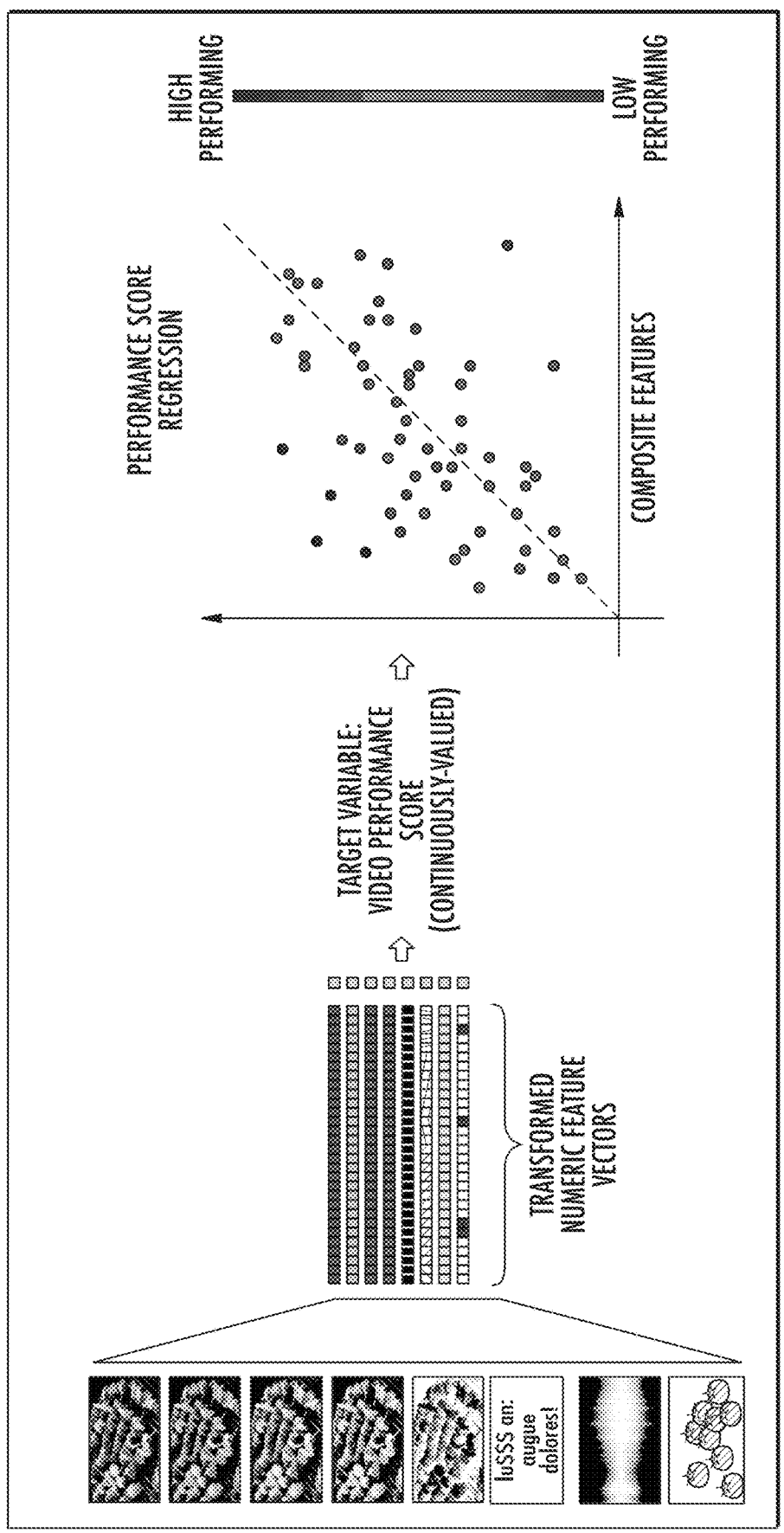
FIG. 5 is a schematic diagram showing how supervised machine learning is used to build a regression model to predict video performance score (computed from engagement metrics including views, likes, dislikes, upvotes, downvotes, shares, links, quotes, and comments) from the vectorized, extracted video content features according to an embodiment.
Figure 6:
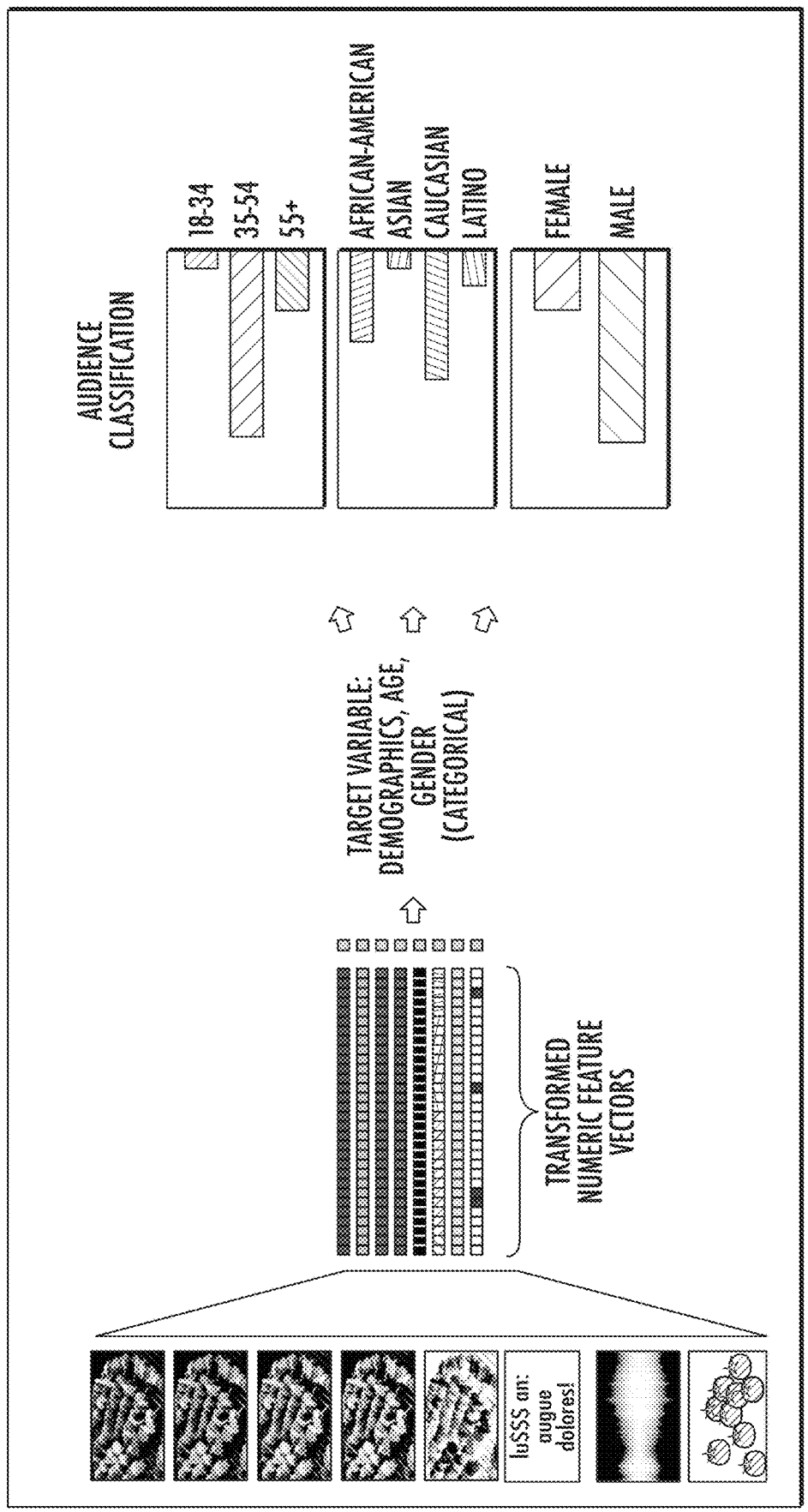
FIG. 6 is a schematic diagram showing how supervised machine learning is used to build a classification model to predict the proportion of audience engagement by demographics (computed from the natural language classifier pipeline shown in FIGS. 1-3) from the vectorized, extracted video content features according to an embodiment.

Once extracted, these elements are computationally transformed into numeric feature vectors that can be projected into a multidimensional space and used for downstream modeling as shown in FIGS. 5 and 6. FIG. 5 shows how supervised machine learning is used to build a regression model to predict a video performance score (computed from engagement metrics including views, likes, dislikes, upvotes, downvotes, shares, links, quotes, and comments) from the vectorized, extracted video content features. FIG. 6 shows how supervised machine learning is used to build a classification model to predict the proportion of audience engagement by demographics (computed from the natural language classifier pipeline shown in FIGS. 1-3) from the vectorized, extracted video content features.

Figure 7:
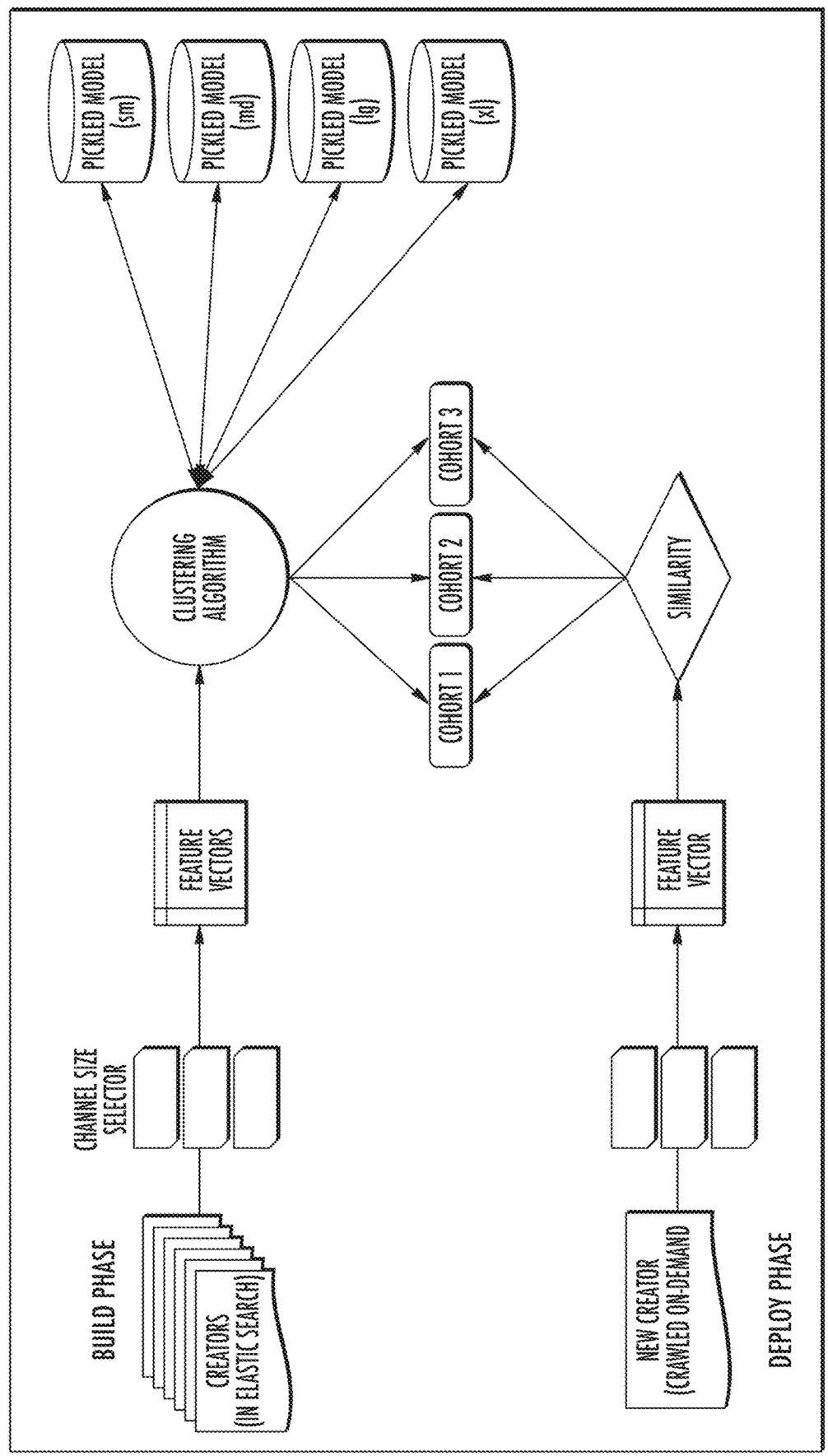
FIG. 7 is a schematic diagram demonstrating how unsupervised machine learning is used to build a series of cohort (creator peer set) models, informed by high-level creator statistics (e.g. number of videos made, number of followers or subscribers, and/or daily views) as well as vectorized, extracted video content and language features according to an embodiment.

By offering an automated computer-implemented method with which to extract and transform raw text, audio, and video into features, embodiments of the present invention also provide a mechanism for comparing any two creators together, generating cross-creator analytics, and offering comparisons within specific peer sets. Peer sets or "cohorts" of creators are formed using unsupervised machine learning, as shown in FIG. 7. Resultant models are stored and reconstituted on demand in deployment to map new creators to existing peer sets.

Figure 8:
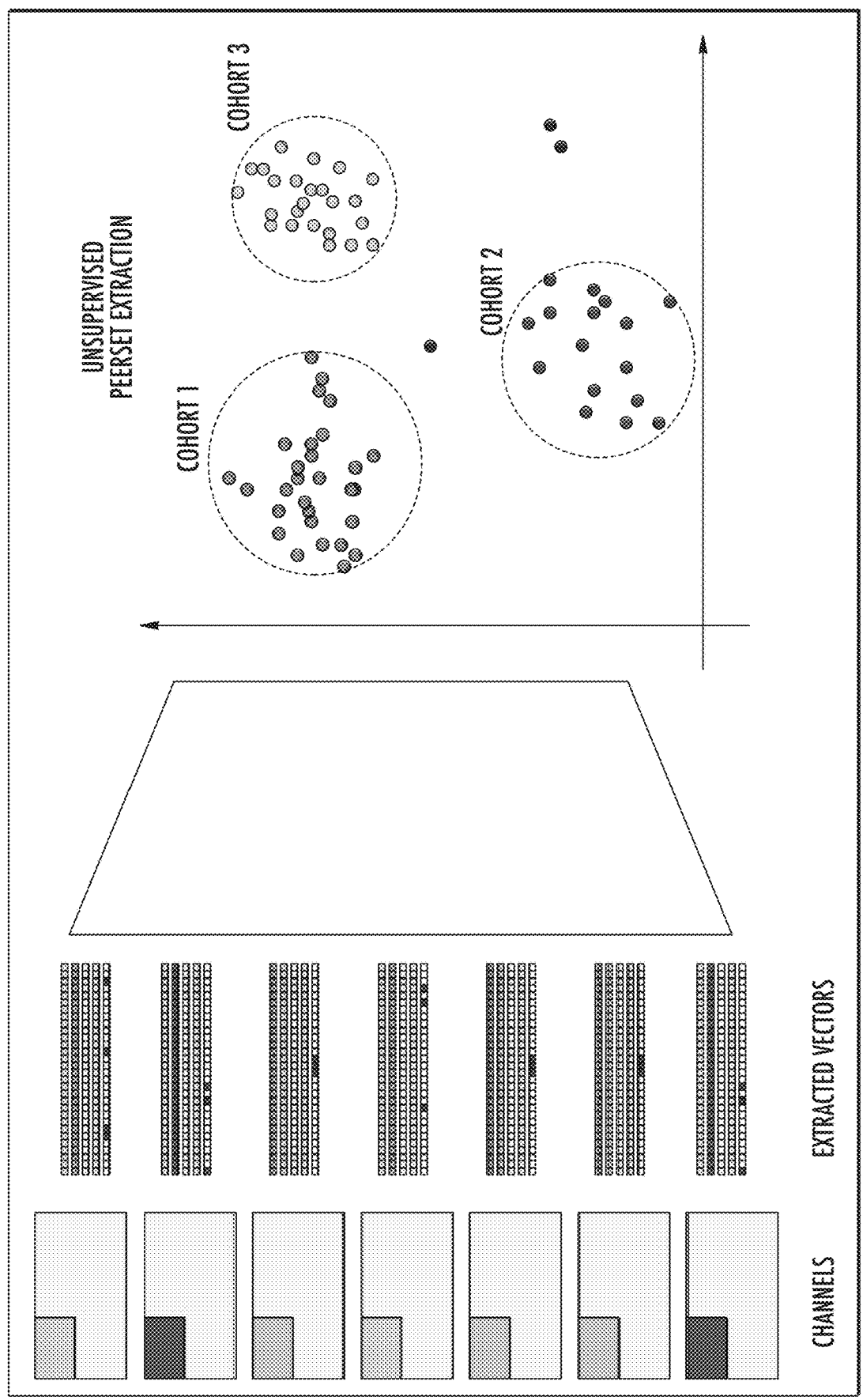
FIG. 8 is a schematic diagram illustrating how unsupervised machine learning is used to find clusters of creators who share similar features in terms of high-level statistics (number of videos made, number of followers or subscribers, daily views), as well as video content and audience demographics according to an embodiment.

The creation of these cohorts is informed by high-level creator statistics (e.g. number of videos made, number of followers or subscribers, and/or daily views) as well as vectorized, extracted video content and language features. FIG. 8 illustrates how unsupervised machine learning is used to find clusters of creators who share similar features in terms of high-level statistics (e.g. number of videos made, number of followers or subscribers, and/or daily views), as well as video content and audience demographics.

Figure 9:
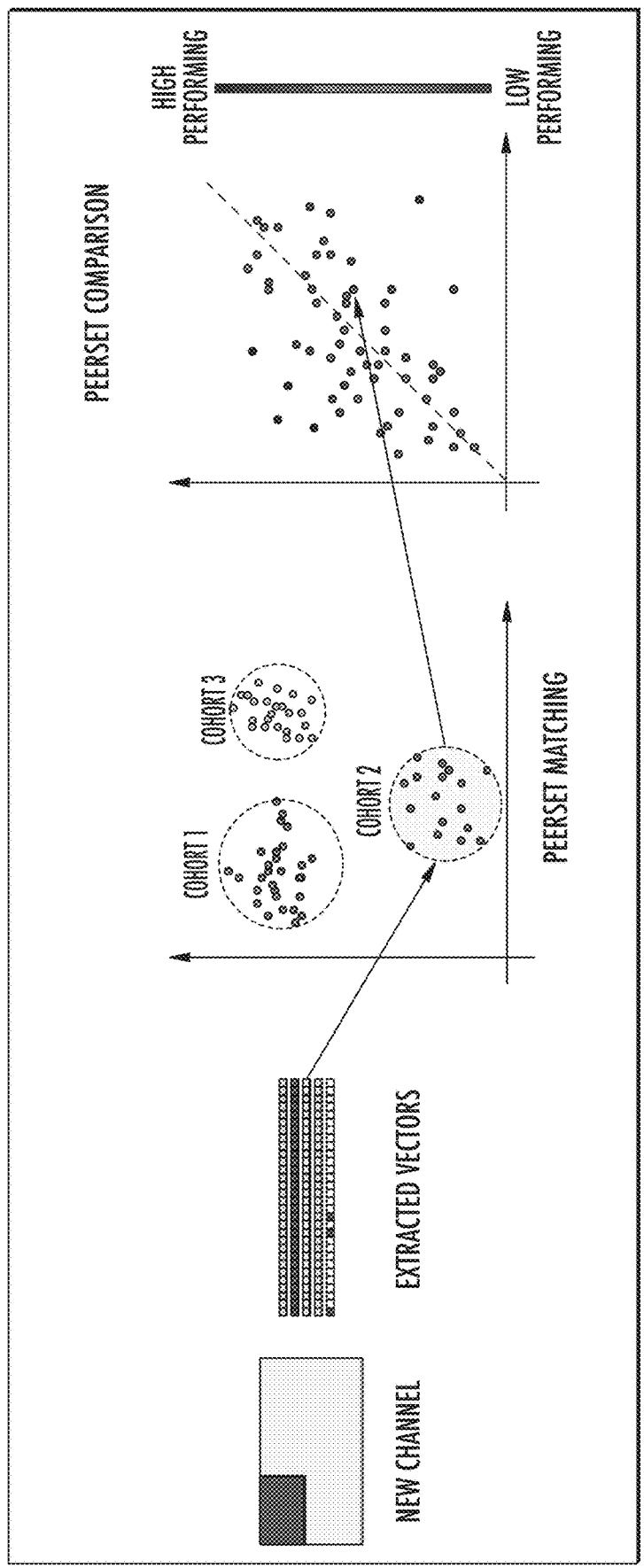
FIG. 9 is a schematic diagram showing how new creators are quickly mapped to their peer set and served content development, messaging, and marketing recommendations with respect to the most and least successful topics, themes, and strategies within that specific peer set according to an embodiment.

Cohort clusters are computationally created and based on the nature of content produced, statistics, location, audience demographics and audience interests. In aspects, each content creator will have a peer-group based on these factors. Therefore, using the cohort models, a new creator can be served recommendations relative to the best practices of relevant successful content creators within their cohort, which can be much more nuanced and specific and reflect unique cohort behavioral patterns. FIG. 9 shows how new creators are mapped to their peer set and served content development, messaging, and marketing recommendations with respect to the most and least successful topics, themes, and strategies within that specific peer set. The practices observed may include content labeling practices such as titles, descriptions, vocabulary words, phrases, tags, and categories, as well as content posting practices such as time of day, day of week, and frequency and other practices related to content creation and marketing.

Figure 10:
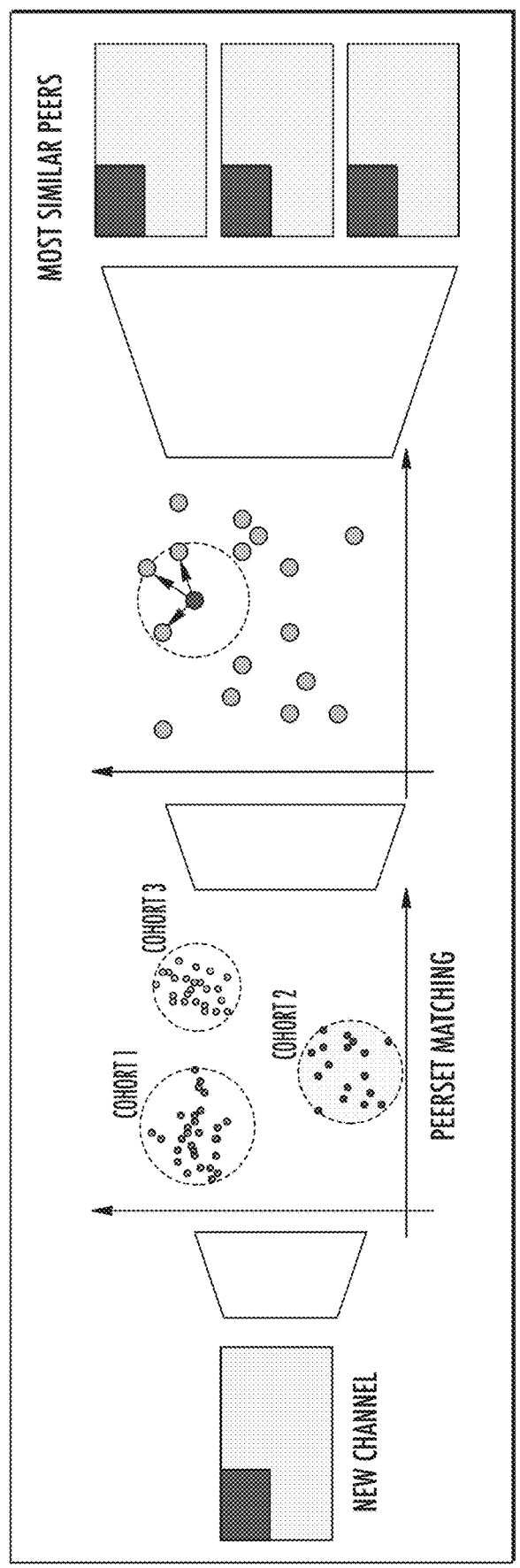
FIG. 10 is a schematic diagram illustrating how, once mapped to their cohort of most relevant peers, creators explore within their cohort cluster and identify their most similar peers within the cohort according to an embodiment.

A nearest neighbor approach is used to find peer sets and the peers are further compared by performance within a cluster. FIG. 10 illustrates how, once mapped to their cohort of most relevant peers, creators explore within their cohort cluster and identify their most similar peers within the cohort.

The present disclosure provides for a computer program comprising computer-executable instructions, which when the program is executed by a computer, cause the computer to carry out any of the processes, methods, and/or algorithms according to the above. The computer-executable instructions can be programmed in any suitable programming language, including JavaScript, C, C #, C++, Java, Python, Perl, Ruby, Swift, Visual Basic, and Objective C.

Also provided herein is a non-transitory computer-readable medium (or media) comprising computer-executable instructions, which when executed by a computer, cause the computer to carry out any of the processes, methods, and/or algorithms according to the above. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include one or more sets of computer-executable instructions for providing an operating system as well as for implementing the processes, methods, and/or algorithms of the invention.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A computer-implemented method to generate predictive models comprising the following steps:
   a. using textual metadata associated with one or more social media video files to extract one or more features from audio, video, and/or text content;
   b. transforming the one or more extracted features into one or more numeric feature vectors representing the one or more social media video files in multidimensional vector space;
   c. using the one or more numeric feature vectors to classify social media video content, content consumers, and/or content producers into demographics;
   d. providing a model training interface capable of re-training when new data becomes available, automated data cleaning, a single, unified computer-implemented interface for social media language classification including computer-implemented methods for classification of arbitrary text that is social media platform agnostic, wherein the single, unified computer-implemented interface is capable of allowing for input of raw text input and for output of predictions over one or more machine learning classifiers; and
   e. sharing functionality across the single, unified computer-implemented interface, including text vectorization and normalization methodologies for automated cleaning and processing raw social media text;
   f. generating one or more analytics and/or recommendations to the content producers or content consumers, wherein the one or more analytics and/or recommendations comprise computer-generated information relating to video publishing, sourcing, targeted advertising, or combinations thereof, wherein the computer-generated information relating to video publishing, sourcing, targeted advertising, or combinations thereof are based on patterns and preferences of the content consumers and the content producers, including demographics, topical content, themes, optimal post time, viewing frequency, social media platform being used, peer sets, viewing length, messaging, marketing information comprising title, description, keywords, hashtags, or combinations thereof;
   g. wherein the one or more extracted features are transformed to numeric feature vectors by creating a set of words and textual features appearing in comments and descriptions or in metadata associated with the one or more social media video files;
   f. wherein the one or more extracted features comprise names, comments, typographic patterns, emojis, hyperlink usage, posting behavior, or combinations thereof, and wherein the one or more extracted features are extracted from text content using natural language processing.

2. The computer-implemented method to generate predictive models according to claim 1, wherein the demographics comprise age, gender and ethnicity, location, direct marketing area, brand or individual creator status, low-level categorical and topical attributes, high-level categorical and topical attributes, political views, cross-platform account linkages, education level and income range, or combinations thereof.

3. The computer-implemented method to generate predictive models according to claim 1, wherein the one or more numeric feature vectors comprise audio data, video data, textual data, or combinations thereof, wherein the one or more numeric feature vectors encode relating to topical interests, consumer sentiments and emotions, entities, or combinations thereof.

4. The computer-implemented method to generate predictive models according to claim 1, wherein the one or more features are extracted using non-deterministic techniques and heuristics for the automated identification of names of people, places, locations, organizations, and products in raw social media text including video descriptions, video comments, social media messages, and social media profile descriptions.

5. The computer-implemented method to generate predictive models according to claim 1, wherein the predictive models comprise one or more supervised or unsupervised machine learning models comprising regression models, classification models, cohort models, ensemble models, or combinations thereof.

6. The computer-implemented method to generate predictive models according to claim 1, wherein the demographics are capable of being computationally inferred based on linguistic features, wherein the computational inference comprises using non-deterministic predictive machine learning models for a plurality of demographic categories, computer training based on a pattern or patterns of consumer names, words the consumers use, how the consumers describe social media profiles, comments consumers make, consumer interactions with social media and video content, or combinations thereof, and wherein the demographic categories comprise age, gender, ethnicity, political views, religious views, location, direct marketing area, brand or individual status, low-level categorical and topical attributes, high-level categorical and topical attributes, cross-platform account linkages, education level and income range, or combinations thereof.

7. The computer-implemented method to generate predictive models according to claim 1, further comprising predicting social media user locations, wherein the predictions comprise using a predictive machine learning model based on combining inferences from locations that consumers describe in textual language including social media profiles, comments, interactions with social media and video content, location names, nicknames, abbreviations, alternate spellings, aliases, partial references, landmarks, or combinations thereof, together with physical distance computations to identify proximate city, state, zip code, county, and/or country.

8. The computer-implemented method to generate predictive models according to claim 1, further comprising using a natural language based machine learning classification model that encodes differences in how the content producers describe their social media profiles, enabling classification of the content producers into categories including brand, company, or individual content producer.

9. The computer-implemented method to generate predictive models according to claim 1, further comprising inferring links between social media profiles from other social media profiles or platforms based on social media profile descriptions and content descriptions, including using a combination of text modeling and natural language processing to identify and extract from free-form text references by the content consumers or the content producers to another social media profile or platform, and automatically linking a handle, Uniform Resource Locator, or username.

10. The computer-implemented method to generate predictive models according to claim 1, further comprising using language and phrases, identified using natural language processing techniques, that content consumers and content producers use to describe social media profiles, interests, and/or content preferences and comments, and mapping the language and phrases to commonly used audience attributes including the Interactive Advertising Bureau (IAB) taxonomy.

11. The computer-implemented method to generate predictive models according to claim 1, wherein language and phrases that content consumers and content producers use to describe profiles, interests, and content preferences and comments, is used to algorithmically extract political views and automatically project, match, or link the political views to a list of political topics.

12. The computer-implemented method to generate predictive models according to claim 1, wherein sparse or limited information about the content consumers' and content producers' education, demographics, location and interests are used as either data points already available or extracted from language and phrases that the content consumers and content producers use to describe themselves, their interests, and their content preferences to automatically predict the content consumers' or the content producers' likely income band or bands.

13. The computer-implemented method to generate predictive models according to claim 1, wherein sparse or limited information about the content consumers' and content producers' education, demographics, location and interests are used as either data points already available or extracted from language and phrases that the content consumers and content producers use to describe themselves, their interests, and their content preferences to automatically predict the content consumers' or the content producers' likely education level.

14. The computer-implemented method to generate predictive models according to claim 1, wherein text descriptions of video content, video comments, social media messages, and social media profile descriptions are used in a natural language processing model to encode differences in how the content producers describe content, which allows the computer-implemented method to algorithmically predict content topics with which the content producer's content is most closely related or aligned.

15. The computer-implemented method to generate predictive models according to claim 1, wherein raw social media text data including video descriptions, video comments, social media messages, and social media profile descriptions, which include a mixture of languages, characters, encodings, emojis, or combinations thereof, are used to automatically extract a most likely primary language of the content producer or consumer.

16. The computer-implemented method to generate predictive models of claim 1, further comprising the following steps:
  i. using raw audio associated with the social media video content and/or a social media profile to classify the social media video content, the content consumers, and/or the content producers into various detected audio content categories; and
  j. wherein the raw audio is processed using computerized sampling frequency, mid-term and/or short-term signal attributes, or combinations thereof, and wherein features used to classify the social media video content, the content consumers, and/or the content producers into various detected audio content categories comprise Gammatone Frequency Cepstral Coefficients, Mel Frequency Cepstral Coefficients, centroid and spread, spectral entropy, spectral flux, short-term energy and entropy, signal zero crossing rate, or combinations thereof.

17. The computer-implemented method to generate predictive models according to claim 1, wherein the one or more extracted features are extracted from raw audio using a combination of computer-implemented filters and calculations that are capable of being used to build audio recognition and/or classification models.

18. The computer-implemented method to generate predictive models according to claim 1, wherein predictive detections and recognitions are made based on raw audio of the one or more social media video files, wherein the predictive detections and recognitions comprise using encoding patterns in audio signals that are capable of automatically predicting a presence of video features, including voices, background noises, video quality, number of speakers, gender of speakers, background music, animals, or combinations thereof.

19. The computer-implemented method to generate predictive models of claim 1, further comprising the following steps:
   i. using raw audio associated with the social media video content and/or a social media profile to classify the social media video content, the content consumers, and/or the content producers into various detected audio content categories; and
   j. using raw video associated with the social media video content and/or the social media profile to classify the social media video content, the content consumers, and/or the content producers into various detected visual content categories; and
   k. wherein each frame image or certain number of frame images of the raw video are processed and then combined to provide an aggregate-video based analysis.

20. The computer-implemented method to generate predictive models according to claim 1, wherein the one or more extracted features are extracted from one or more frames of raw video using a combination of computer-implemented filters and calculations that are capable of being used to build image recognition and/or classification models.

21. The computer-implemented method to generate predictive models according to claim 1, wherein predictive detections and recognitions are made based on raw video of the social media video files using machine learning models comprising using encoding patterns in image signals to automatically predict a presence of video features, including number of people, diversity of people, video quality, gender of people, objects, background, scenes, or combinations thereof.

22. A computer-implemented method using one or more computer models using natural language processing, feature extraction, numeric feature vectorization, and text classifiers to extrapolate detailed consumer profiles from social media video content consumption and interaction patterns, including the following steps:
   a. automatically creating content consumer profiles using combined results of one or more analytics and/or recommendations comprising computer-generated information relating to video publishing, sourcing, targeted advertising, or combinations thereof, wherein the computer-generated information relating to video publishing, sourcing, targeted advertising, or combinations thereof are based on patterns and preferences of video consumers, including demographics, topical content, themes, optimal post time, viewing frequency, social media platform being used, peer sets, viewing length, messaging, marketing information comprising title, description, keywords, hashtags, or combinations thereof;
   b. automatically establishing relationships between the content consumer profiles and video content consumption behaviors and preferences;
   c. automatically identifying special interest groups amongst video consumers; f. detecting social media content related to a subject, topic, person, TV show and/or movie title based on automatic similar search term generation, text vectors, and content classifications;
   d. detecting social media content related to a subject, topic, person, TV show and/or movie title based on automatic similar search term generation, text vectors, and content classifications;
   e. identifying consumers interested in the detected social media content based on consumption patterns, peer analysis and look-alike modeling; and
   f. combining the consumers or the detected social media content with other predictions on consumer demographics, location, and content preferences to create audience segments that are capable of being used for content targeting, ad targeting, audience analytics, recommendations for content providers, or combinations thereof;
   g. making recommendations to a content provider on video content, posting times, video publishing, sourcing, or targeted advertising;
   h. wherein the demographics comprise age, gender and ethnicity, location, direct marketing area, brand or individual creator status, low-level categorical and topical attributes, high-level categorical and topical attributes, political views, religious views, cross-platform account linkages, education level and income range, or combinations thereof.

23. The computer-implemented method of claim 22, further comprising identifying the video consumption patterns of the special interest groups comprising the following steps:
   a. automatically establishing a baseline in video consumption behavior within the special interest groups;
   b. automatically identifying the video consumption patterns and engagement behavior, including views, likes, dislikes, upvotes, downvotes, shares, links, quotes, comments, or combinations thereof, within the special demographic groups; and
   c. automatically identifying trends in video topics and themes within the special interest groups.

24. The computer-implemented method of claim 22, further comprising establishing look-a-like audiences using similarity measures including education, demographics, political beliefs, and/or location to extrapolate video content preferences and video consumer attributes from one group of video consumers onto a second group of video consumers.

25. The computer-implemented method according to claim 22, further comprising;
   i. automatically detecting and recognizing linguistic terms related to a first one or more topics, keywords, categories, television show titles, movie titles, brand names, celebrity names, actor names, or a combination thereof, using the natural language processing, consumer interaction data, social media posts, video frames, video audio, the video consumer demographics, or combinations thereof; and j. a combination of unsupervised and supervised machine learning models to generate a non-deterministic list of a second one or more topics, keywords, categories, television show titles, movie titles, brand names, celebrity names, actor names, or a combination thereof.

\* \* \* \* \*